United States Patent [19]
Chung et al.

[11] Patent Number: 5,879,578
[45] Date of Patent: Mar. 9, 1999

[54] ETCHED/LUBRICATED SWAGE BALLS FOR USE IN DASD SUSPENSION-ARM ATTACHMENT

[75] Inventors: Gwendolyn Jones Chung; Ramamurthy Nagarajan, both of San Jose; Stephen Arnold Fletcher Olson, Palo Alto; Robert Bruce Prime; Dennis Frederick Ramos, both of San Jose; Hoa-Binh Thi Tu, San Jose, all of Calif.

[73] Assignee: International Business Machines Corporation, Armonk, N.Y.

[21] Appl. No.: 820,395

[22] Filed: Mar. 12, 1997

[51] Int. Cl.⁶ ........................................... C23F 1/00
[52] U.S. Cl. ........................ 216/100; 216/22; 216/102; 216/103; 134/41
[58] Field of Search ............... 216/22, 100, 102, 216/103; 134/41

[56] References Cited

U.S. PATENT DOCUMENTS

| | | | |
|---|---|---|---|
| 3,831,265 | 8/1974 | Louzon et al. | 29/592 |
| 5,100,714 | 3/1992 | Zsamboky | 428/137 |
| 5,229,899 | 7/1993 | Brown et al. | 360/97.02 |

FOREIGN PATENT DOCUMENTS

| | | |
|---|---|---|
| 59-148179 | 8/1984 | Japan . |
| 62-181395 | 8/1987 | Japan . |
| 63-64684 | 3/1988 | Japan . |
| 63-251981 | 10/1988 | Japan . |
| 2-230574 | 9/1990 | Japan . |
| 4-082989 | 3/1992 | Japan . |
| 4-098653 | 3/1992 | Japan . |
| 4-102279 | 4/1992 | Japan . |
| 4-155682 | 5/1992 | Japan . |

OTHER PUBLICATIONS

"Lubricant–Stablizing Structure For Magnetic Disks", IBM Technical Disclosure Bulletin, vol. 28 No. 2, Jul. 1985, pp. 796–797.

*Primary Examiner*—R. Bruce Breneman
*Assistant Examiner*—Anita Alanko
*Attorney, Agent, or Firm*—Noreen A. Krall

[57] ABSTRACT

An etched, lubricated swage ball for use in swaging a head gimbal assembly to an actuator arm in a magnetic disk drive, and a method for making the same. The present invention discloses a lubricating system for swage balls used in a disk drive system which is free from transferrable aluminum oxide, other hard materials or excess solid lubricant which could be deposited on the clean disk surface during operation. The swage balls are first pretreated by cleaning and then etching to remove residual alumina from the surface of the swage balls. The cleaned, etched swage balls are then lubricated in a fluorocarbon lubricating system, thereby producing an etched, lubricated swage ball which is cleaner than that found in the prior art.

12 Claims, 6 Drawing Sheets

ETCHED/LUBRICATED SWAGE BALLS FOR USE IN DASD SUSPENSION-ARM ATTACHMENT

BACKGROUND OF THE INVENTION

1. Field of the Invention

This invention relates in general to hard disk drives, and more particularly, to a system for etching and lubrication of swage balls used in the DASD suspension-arm attachment swaging process of head stack assembly (HSA).

2. Description of Related Art

Moving magnetic storage devices, especially magnetic disk drives, are the memory device of choice. This is due to their expanded non-volatile memory storage capability together with a relatively low cost. Accurate retrieval of the stored information from these devices becomes critical, requiring the magnetic transducer to be positioned as close to the storage media as possible. Optimally, the transducer may actually contact the media.

Magnetic disk drives are information storage devices which utilize at least one rotatable magnetic media disk having concentric data tracks defined for storing data, a read/write transducer for reading data from and/or writing data to the various data tracks, a slider for supporting the transducer adjacent the data tracks typically in a flying mode above the storage media, a suspension assembly for resiliently supporting the slider and the transducer over the data tracks, and a positioning actuator coupled to the transducer/slider/suspension combination for moving the transducer across the media to the desired data track and maintaining the transducer over the data track center line during a read or a write operation. The transducer is attached to or is formed integrally with the slider which supports the transducer above the data surface of the storage disk by a cushion of air, referred to as an air bearing, generated by the rotating disk. The transducer/slider/suspension assembly is often referred to as the head gimbal assembly (HGA).

Alternatively, the transducer may operate in contact with the surface of the disk. Thus, the suspension provides desired slider loading and dimensional stability between the slider and an actuator arm which couples the transducer/slider/suspension assembly to the actuator. The suspension is required to maintain the transducer and the slider adjacent the data surface of the disk with as low a loading force as possible. The actuator positions the transducer over the correct track according to the data desired on a read operation or to the correct track for placement of the data during a write operation. The actuator, either rotary or linear, is controlled to position the transducer over the desired data track by shifting the combination assembly across the surface of the disk in a direction generally transverse to the data tracks.

Currently, ball swaging is the preferred method of attachment of the head suspension assembly to the actuator arm. Swaging is a process for connection where the wall thickness of a thin wall tubular component is expanded against a thick wall component by plastic deformation. More specifically, it is a process used in connecting a suspension to an actuator in a hard disk drive. The process of swaging involves pressing and fastening the periphery of a boss to the inner face of a through-hole in an actuator arm. The boss is formed in a mount plate or mount block of the transducer suspension. The boss is inserted into the through-hole formed in the actuator arm. Then, a ball of a little larger size than the inner diameter of the opening of the boss is passed through. The swaging process generally provides a stronger joint than a press fit, because the thin-wall member is work hardened by the deformation process, which increases tensile strength. Examples of swaging technology include the HTI interlock swage, the Seagate tandem swage and the IBM thin back-to-back swage.

In order for swaging to be effective, swage balls need to be lubricated. The lubricant prevents development of high swage forces which can lead to particle generation by galling, and to product deformation as well. A popular solid film lubricant used for this purpose is tungsten disulfide, which provides excellent lubricity but is a significant source of particulate and smear type contamination in disk drives. In addition, the steel balls typically need to be roughened by methods such as abrasive blasting with aluminum oxide (alumina) in order for the solid lubricant to adhere strongly enough. Residual alumina is another form of unacceptable particulate contamination in hard disk drives, particularly those with MR heads.

Accordingly, it can be seen that there is a need for a new process and solution for preparing the balls used for the swaging of transducer suspensions to actuators for use in hard disk drives.

SUMMARY OF THE INVENTION

To overcome the limitations in the prior art described above, and to overcome other limitations that will become apparent upon reading and understanding the present specification, the present invention discloses a lubricating system for swage balls used in the production of a disk drive system which is free from transferrable aluminum oxide, other hard materials or excess solid lubricant which could be deposited on the clean disk surface during fabrication or disk drive operation.

The present invention teaches a fluorocarbon system which is used to lubricate swage balls, which are then used in the swaging process for DASD suspension/arm attachment. In a preferred embodiment, the swage balls are first pretreated by cleaning and then etching to remove residual alumina from the surface of the swage balls. The cleaned, etched swage balls are then lubricated in a fluorocarbon lubricating system, thereby producing an etched, lubricated swage ball which is cleaner than that found in the prior art and which does not degrade in any way the swaging performance.

The primary purpose of etch step for this process is to remove embedded alumina from the ball surface. This alumina is present on the ball surface from the forming process for the ball which includes a polishing procedure whereby balls are tumbled with alumina media. Roughening of the surface is a secondary item.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples in accordance with the invention.

BRIEF DESCRIPTION OF THE DRAWINGS

Referring now to the drawings in which like reference numbers represent corresponding parts throughout.

DETAILED DESCRIPTION OF THE INVENTION

Disk drives increasingly tend to utilize multiple heads that electromagnetically act on multiple recording disks mounted on a single rotatable spindle. Head gimbal assemblies (hereinafter "HGA"s) are provided to support and position the heads over desired radial positions on the magnetic disks. HGAs include several independent members (for example, load beam and flexure, often referred to as the suspension) that terminate at a point of attachment for a slider that carries a transducer head. As traditionally constructed, the separate members are attached to the actuator arm by swaging to support the slider in its radial movement over the magnetic medium in response to the controlled movements of an actuator motor. The combination actuator arm and HGA is often referred to as a head stack assembly (hereinafter "HSA"s). For multiple disk storage devices, a plurality of actuator arms are attached to common pivot point to form an actuator comb, with each arm attached to a separate HGA.

The swaging process is the method of choice for mechanically attaching head gimbal assemblies to the arms of the actuator. To accomplish this, a stainless steel ball of specified diameter is forced through a cylindrical boss on the HGA which fits into a swage through-hole on the actuator arm. The swage balls are typically lubricated to reduce swage forces and prevent galling of the swage balls, spuds and/or the actuator arms. The lubricant on the swage ball or in the swaging channel just before swaging also tends to reduce the wear on the swage ball. However, residual contaminants from prior art lubricating systems can be easily transferred from the head stack assembly to the head or the disk. Residual aluminum oxide as well as tungsten disulfide residues from this process have been found to contribute to disk read errors, soft read errors, hard read errors, thermal asperities, etc.

In accordance with a preferred embodiment of the present invention, swage balls are cleaned, etched and lubricated with a lubricating system that is free of aluminum oxide, other hard materials or excess lubricant which can be deposited and adversely affect the head disk interface.

The cleaning and etching process in accordance with the present invention is described herein in Example 1.

EXAMPLE 1

Swage balls were obtained which are 440C stainless steel. One such ball used for the swaging process is 0.083" 440C-10 manufactured by New England Miniature Ball [NEMB]. Initially, the swage balls may have a coating of lubricant or grease and therefore must be degreased using isopropanol or other suitable solvent to produce degreased swage balls. The solvent is decanted from the swage balls, which are then transferred to sheets of clean filter paper where they are dried at room temperature. The filter paper helps to draw excess liquid from the swage balls, allowing the balls to be fully dried when complete, thereby producing cleaned, dry swage balls.

Next, the clean, dry swage balls are etched to produce etched swage balls.

In a preferred embodiment, the swage balls are etched in a solution comprising 3 parts distilled water, 2 parts lab grade hydrochloric acid (HCl), and 1 part nitric acid ($HNO_3$), lab grade 70%. The balls are immersed in the etching solution for 50 to 70 seconds. The balls may be agitated by a stirring rod, or simply submerged in the etching solution. Next, the balls are rinsed in flowing distilled or deionized water. The balls may be rinsed from 1 to 4 minutes, or until the etching solution is removed. The swage balls are then drained. Optionally, the balls may be dipped in clean isopropanol to aid in the drying process. The balls are then dried on filter paper at room temperature to remove excess liquid.

The etching process has been found to attack the softer, iron rich areas of the swage ball which are most likely to have embedded alumina. The resulting surface of the swage ball should be one of protruding chrome carbides.

Once the swage balls have been cleaned and etched as described in Example 1, they are lubricated in a lubricant that is free of transferrable aluminum oxide, other hard materials or excess solid lubricant. A preferred embodiment of one such lubricating system includes rinsing the clean, etched swage balls in a solution of Fomblin YR (854). An example of a preferred lubrication process and solution is set forth in Example 2:

EXAMPLE 2

The clean, etched, swage balls as set forth in Example 1 above are placed in a stainless steel basket or other suitable container for applying a lubricant. Preferably, the swage balls are treated within 24 hours after etching in order to prevent oxidation or contamination of the surface of the cleaned, etched balls. The etched swage balls are submerged in a perfluorohexane solution containing from 10–12 grams of Fomblin YR per liter of solvent. While immersed in the solvent, the swage balls are moderately agitated for a period of time ranging from 3 to 5 minutes. The swage balls are then removed from the perfluorohexane solution and placed on filter paper to drain the excess liquid. It has been found that the paper helps draw excess liquid from the surface of the swage ball.

Table 1 shows a comparison of various lubricants that may be used in the lubricating process for the swage balls, and the resulting impact those solutions have on the swaging force for particular swage joint design. It is understood that results would vary depending upon swage joint design; however, the ranking set forth in Table 1 would remain the same. In row one, the prior art solution of tungsten disulfide is shown to result in a swaging force average of 41.7 lbs, with a standard deviation of 5.7. In row two, the Fomblin YR solution described above in Example 2 shows a swaging force of 52.3 lbs, with a standard deviation of 3.9. And, lastly, row three shows a first alternative solution to the preferred Fomblin YR solution. The first alternative solution is described in Example 3 below.

TABLE 1

| | Short Spud Swaging Force (lbs) | |
|---|---|---|
| Lubricant | Average | Standard Deviation |
| Tungsten Disulfide | 41.7 | 5.7 |
| Fomblin YR (854) | 53.2 | 3.9 |
| Z-DOL (2000 baked) | 57.4 | 11.0 |

A first alternative lubricating system (row three of Table 1) includes rinsing clean swage balls in a solution of Fomblin Z-DOL perfluoroether reactive lubricant in perfluorohexane solvent. If the treated swage balls are subsequently rinsed with fresh perfluorohexane, it has been found that the average swaging force increases by more than 20%, and the standard deviation increases by more than 50%. These changes have been attributed to the removal of most or all of the Z-DOL. Baking of the swage balls after rinsing in the lubricant system rendered them stable to subsequent rinsing with fresh solvent, and lowered the average swaging force, as shown in Table 2 and described in Example 3. The process is described in the following Example 3:

EXAMPLE 3

Etched swage balls are lubricated in a 5 g/l solution of Z-DOL in perfluorohexane. Next, the treated swage balls are baked for 2 to 3 hours, at 160° C. Electron spectroscopy for chemical analysis (ESCA) indicated a coating of about 30 Angstroms of lubricant on the surface of the swage balls. Results are shown in the table below:

TABLE 2

| | Long Spud Swaging Force (lbs) | |
|---|---|---|
| Lubricant | Average | Standard Deviation |
| Tungsten Disulfide | 34.1 | 2.7 |
| Z-DOL (2000 unbaked) | 47.4 | 9.3 |
| Z-DOL (2000 baked) | 41.4 | 5.8 |
| Z-DOL (4000 baked) | 42.1 | 7.2 |
| Z-DISOC (unbaked) | 44.2 | 7.8 |

As illustrated by the above Examples, a cleaner process without degradation of the swaging performance results from cleaning/etching the swage balls as previously described in Example 1, and then applying a lubricating system to the freshly etched balls, as described in either Example 2 or Example 3.

RESULTS

The efficacy of the disclosed etch/lubricating processes, described in Examples 1–3, in eliminating the transferrable contaminants known to cause disk read errors from the swaging process is shown in the following results. As manufactured, swage balls were found by electron microprobe analysis to have 0.3% aluminum oxide on the surface. After etching, the amount of aluminum oxide was below the detection limits of the measurement (0.03%), demonstrating the removal of aluminum oxide by the chemical etch. The results of a separate study of extractable contamination are shown in Table 3 below, where swage balls were exposed to ultrasonic extraction and the number of particles per ball were measured.

TABLE 3

| Lubrication System | Particles per Ball (Average) |
|---|---|
| Aluminum oxide/tungsten disulfide | 6870 |
| Chemical etch/Fomblin YR | 1250 |

This result demonstrates a better than five-fold reduction in the total amount of potentially transferrable contamination for swage balls made with the lubrication process disclosed herein. Furthermore, swage balls treated with the disclosed processes are free of harmful aluminum oxide.

Figure 1:
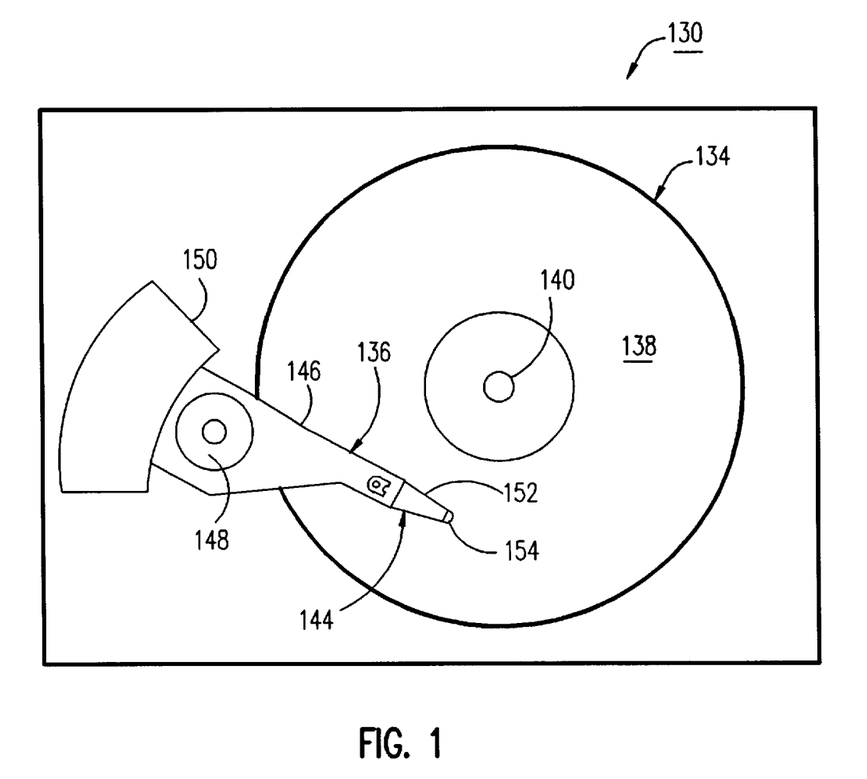
FIG. 1 illustrates top view of a magnetic storage system including a head gimbal assembly attached to an actuator arm in accordance with the present invention.
Figure 2:
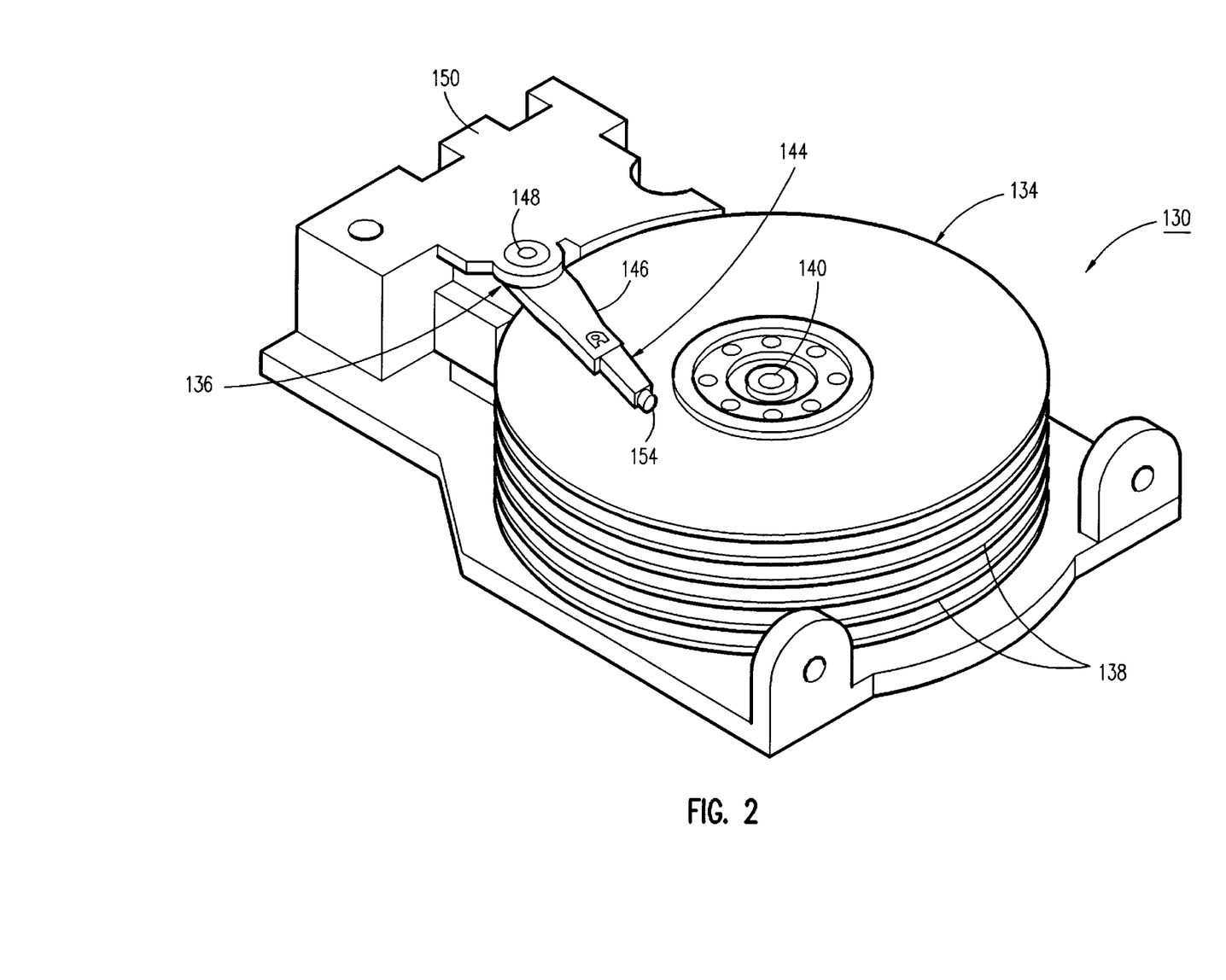
FIG. 2 illustrates an isometric view of a magnetic storage system including a head gimbal assembly attached to an actuator arm in accordance with the present invention.
Figure 3:
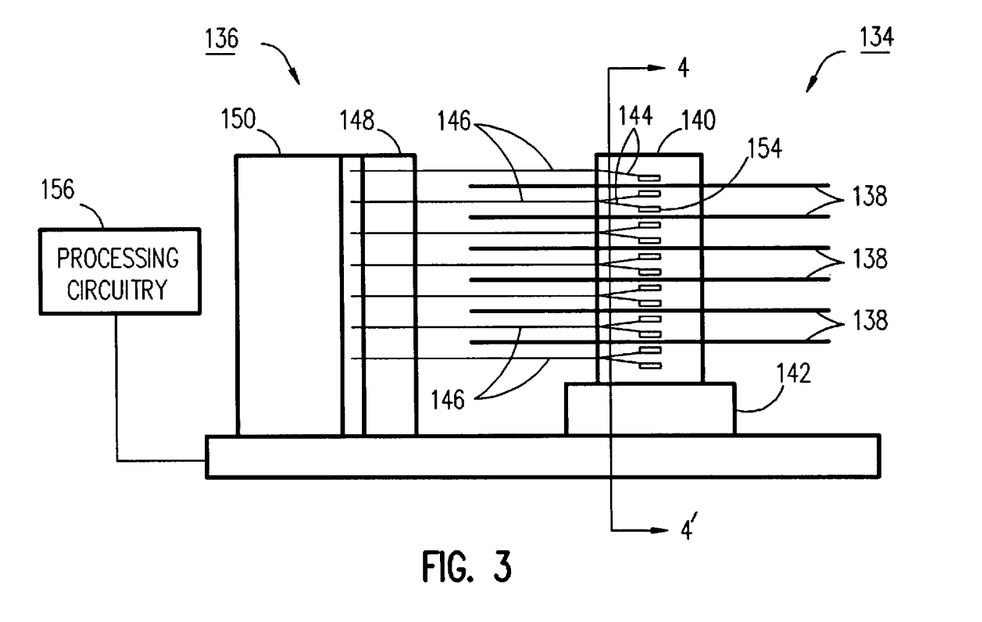
FIG. 3 illustrates a side, sectional view of a magnetic storage system including a head gimbal assembly attached to an actuator arm in accordance with the present invention.

Referring now to FIGS. 1, 2 and 3, a disk drive 130 is illustrated, and employs a disk stack assembly 134 and a head stack assembly 136. The disk stack assembly 134 includes a plurality of vertically stacked disks 138 that are supported for rotation on a spindle 140, which in turn is rotated by a motor 142. The head stack assembly 136 includes a plurality of vertically-stacked head gimbal assemblies 144, each assembly being mounted to a respective actuator arm 146 in a manner that embodies the present invention. Each of the actuator arms 146 is mounted for rotation on an actuator hub 148 which is rotated by a voice coil 150. Each head gimbal assembly 144 includes a load beam 152, which has mounted thereon a slider 154 that carries a magnetic head (not shown) for reading and writing magnetic signals on the disk 138.

Processing circuitry 156 (See FIG. 3) is operatively connected to the spindle motor 142, the voice coil 150, and the magnetic heads (not shown) in order to rotate the disks 138, and displace the actuator arms 146 and to read and write on the disks 138, respectively. When the voice coil 150 is operated, the magnetic heads on the slider 154 are moved to selected circular tracks (not shown) on the disks 138 where information is magnetically read and magnetically written by the heads. Because of direct access to the circular tracks by simple rotation of the actuator arm 146, this type of storage device is known as direct access storage device (DASD).

Each of the load beams 152 pre-loads the respective slider 154 on the surface of the disks 138. When the disks 138 are rotated, each disk creates a cushion of air (an "air bearing") that counterbalances the pre-loading applied to the load beam 152. This counterbalancing causes the slider 154 to fly slightly off the surface of the disk 138, on the order of 0.075 microns. The surface of the slider 154 that is supported by this air bearing is known as the air bearing surface (ABS). In some applications, the surface of the disk 138 may be provided with a lubricant (not shown) allowing the ABS of the slider 154 to slightly contact the surface of the disk 138 when it is rotated. The head gimble assembly 144 is constructed to permit slight vertical movements as well as pitch and roll of the slider 154 during rotation of the magnetic disk 138.

Figure 4:
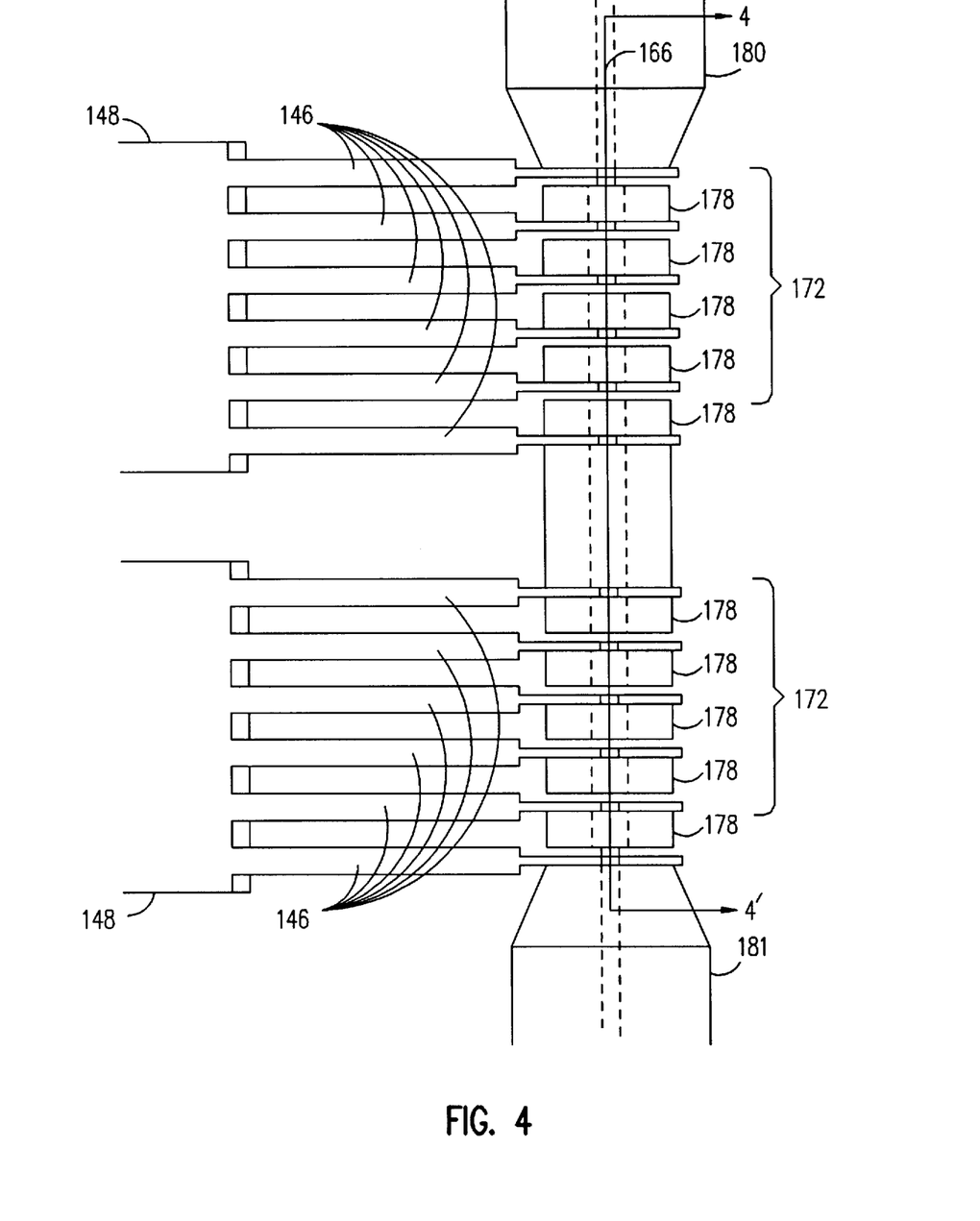
FIG. 4 illustrates the swaging channel during actuator build showing the clamp and spacer tooling mechanisms.
Figure 5A:
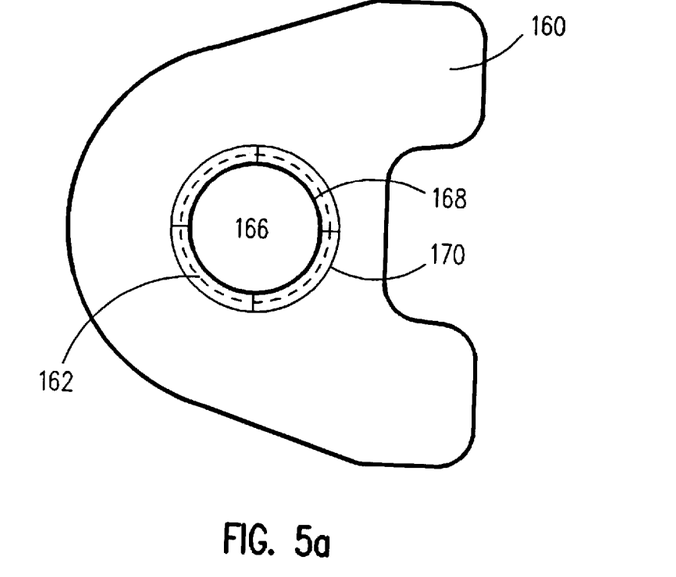
FIGS. 5a and 5b are top and isometric views respectively of a mount plate.
Figure 5B:
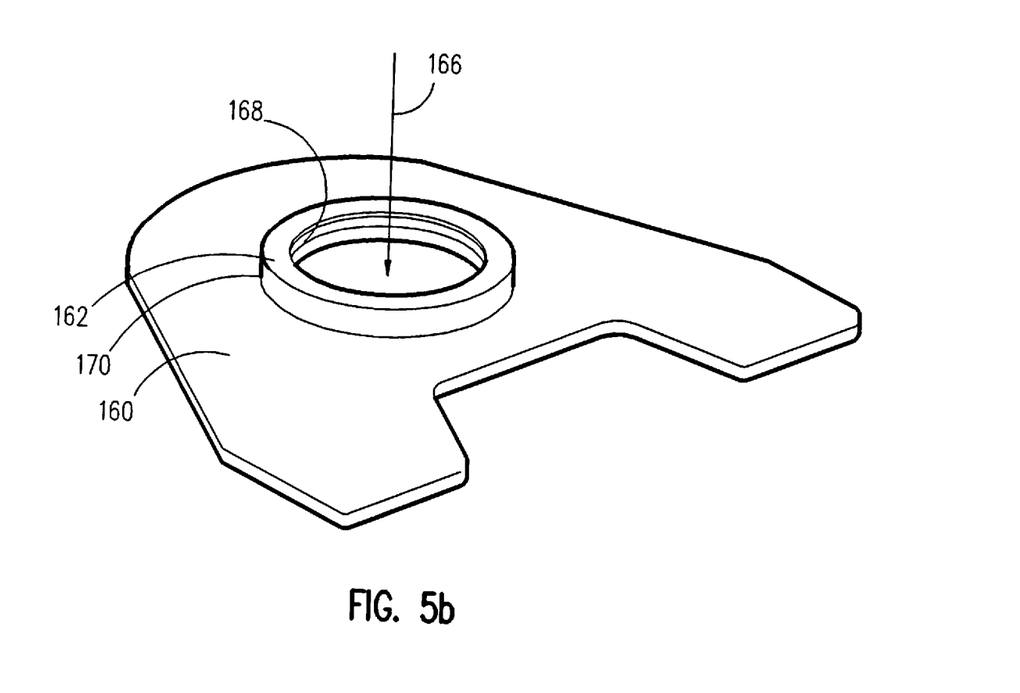
Figure 6:
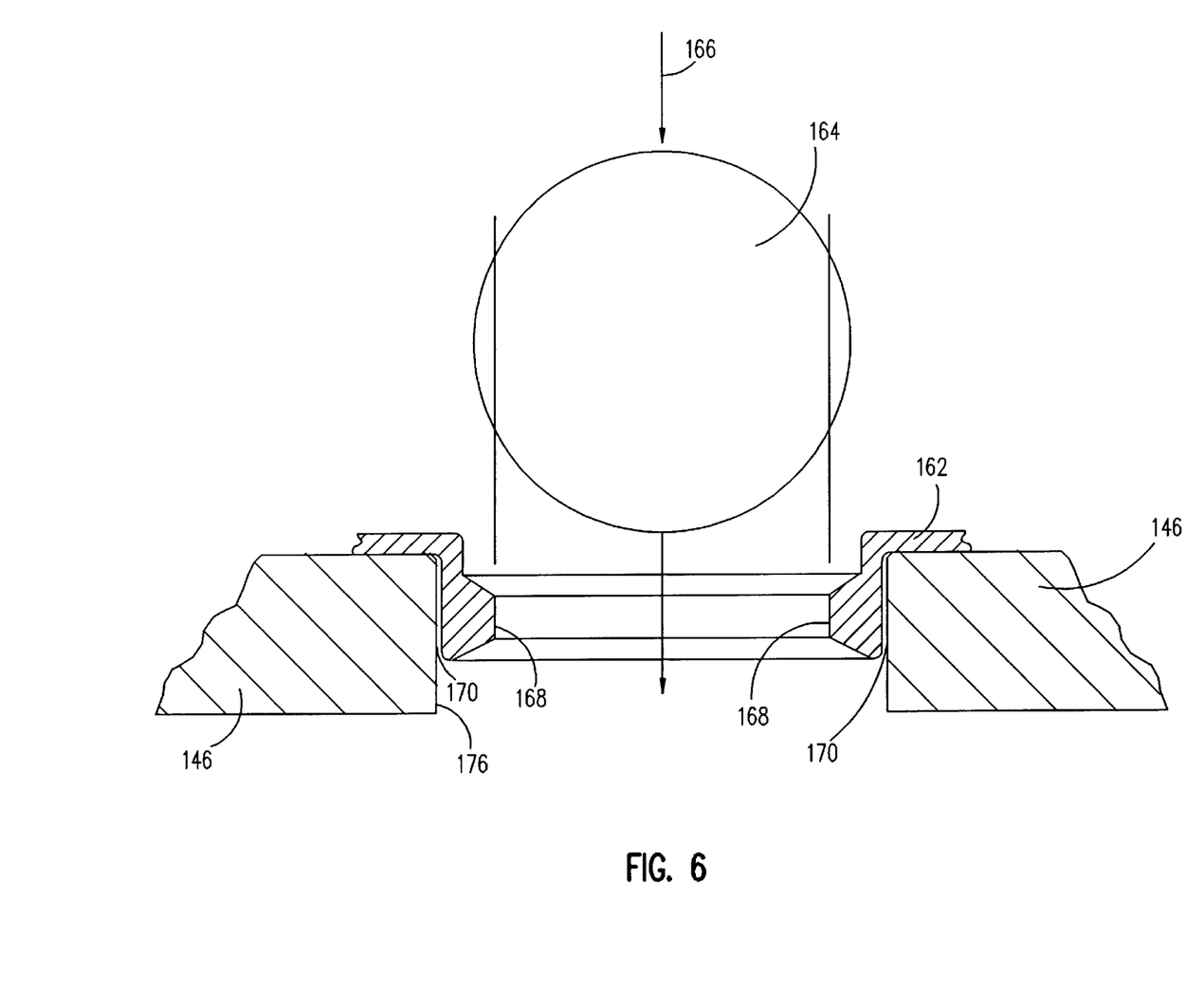
FIG. 6 is a sectional view of a swage ball being swaged through a mount plate.
Figure 7:
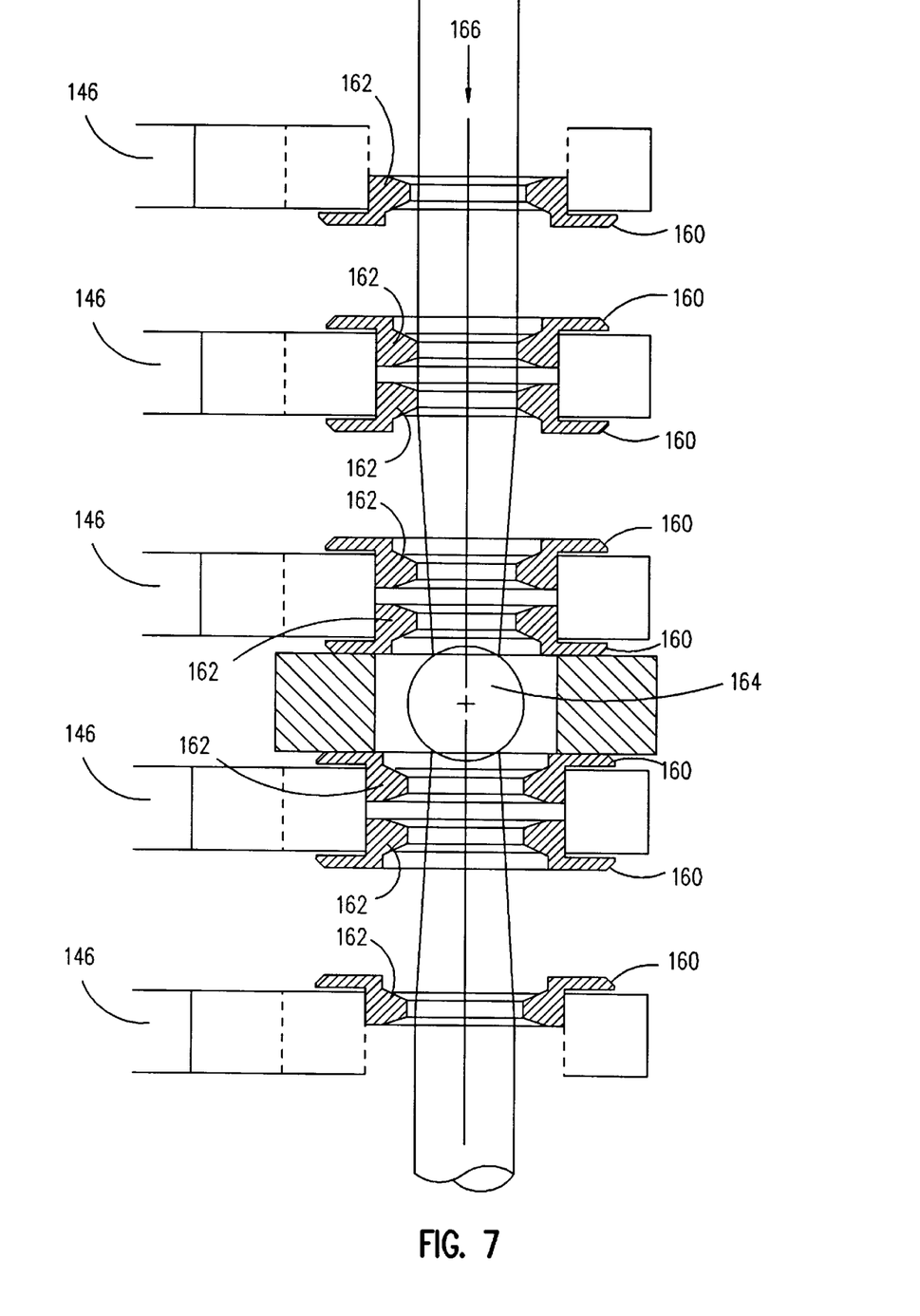
FIG. 7 is a side, sectional view of a swage ball being swaged through an actuator comb assembly.

The swaging process for attachment of HGA's to the actuator arms in shown and described in connection with FIGS. 4 through FIG. 7. Specifically, FIG. 4 shows a side view of the swage channel 166 at the end of the actuator arms 146 in an actuator comb assembly 172. FIGS. 5a and 5b are a top view and an isometric view of a mount plate 160, respectively. FIG. 6 is a side, sectional view of a swage ball 164 being swaged through a single mount plate on a single actuator arm 146, and FIG. 7 shows the swaging process for an actuator comb assembly 172.

Referring first to FIGS. 5a and 5b, it is seen that the mount plate 160 includes a cylindrical boss 162 having an inner face 168 and an outer periphery 170. The outer periphery 170 is inserted into a through-hole 176 in the actuator arm 146.

With reference to FIG. 6, it can be seen that the process of swaging includes the pressing and fastening of the periphery 170 of the cylindrical boss 162 to the inner face of the through-hole 176 in the actuator arm 146. FIGS. 4 and 7 shows the process repeated for an actuator comb assembly 172. Here, HGAs are placed one by one into the comb assembly 172 and are held against the arm tips 146 with retaining fingers until all "bottom" head gimbal assemblies are in place. Tightly fitting spacers 178 are inserted between mount plates on the suspensions 152. The comb arms 146 and spacers 178 are then clamped between a movable clamp 180 and anvil 181. The swage ball 164 is then driven through each mount plate 160 using a swaging rod through swage channel 166 to expand the peripheral boss 170 into the arm holes 176. Then the process is repeated to accomplish the attachment of all the "top" head gimbal assemblies. It is understood that the "top" and "bottom" processes may easily be reversed.

One of the advantages of the present etch and lubrication processes is that in the HSA and HDD assembly processes, the potential for contamination of the head and disk surfaces is greatly reduced. It should be understood that various changes and modifications to the presently preferred embodiments that are described herein will be apparent to those skilled in the art. Such changes and modifications can be made without departing from the spirit and scope of the present invention, and without diminishing its attendant advantages. It is, therefore, intended that such changes and modifications can be covered in the appended claims:

What is claimed is:

1. A method for treatment of swage balls used in the swaging process of actuator arm/suspension attachment in a magnetic head suspension assembly for a magnetic storage system, comprising:

etching the swage balls to remove aluminum oxide; and lubricating the swage balls in a lubricating system that is free of aluminum oxide, hard particles and contaminants.

2. The method for treatment of swage balls as set forth in claim 1, wherein the swage balls are etched in a solution comprising three parts distilled water, two parts hydrochloric acid, and one part nitric acid.

3. The method for treatment of swage balls as set forth in claim 2, further comprising the step, before the etching step, of cleaning the swage balls.

4. The method for treatment of swage balls as set forth in claim 3, wherein the cleaning step includes immersing the balls in isopropanol.

5. The method for treatment of swage balls as set forth in claim 1, wherein the lubricating step comprises:

immersing the swage balls in a perfluorohexane solution; and agitating the swage balls.

6. The method for treatment as set forth in claim 5, wherein the perfluorohexane solution is comprised of between 10 and 12 grams of Fomblin YR per liter of solvent.

7. The method for treatment as set forth in claim 6, wherein the swage balls are agitated for 3 minutes in the perfluorohexane solution.

8. The method for treatment as set forth in claim 6, wherein the swage balls are agitated for 5 minutes in perfluorohexane solution.

9. The method for treatment as set forth in claim 6, wherein the perfluorohexane solution is comprised of 5 grams per liter of Z-DOL.

10. The method for treatment as set forth in claim 9, further comprising the step of baking the swage balls.

11. The method for treatment as set forth in claim 10, wherein the swage balls are baked for a period of time ranging from 2 to 3 hours.

12. The method for treatment as set forth in claim 11, wherein the swage balls are baked at a temperature in the range of 160° C.

* * * * *